(12) United States Patent
Kuwabara

(10) Patent No.: US 9,663,180 B2
(45) Date of Patent: May 30, 2017

(54) STEERING STRUCTURE FOR SADDLE TYPE VEHICLE

(71) Applicant: HONDA MOTOR CO., LTD., Tokyo (JP)

(72) Inventor: Naoki Kuwabara, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/663,920

(22) Filed: Mar. 20, 2015

(65) Prior Publication Data

US 2015/0274245 A1  Oct. 1, 2015

(30) Foreign Application Priority Data

Mar. 31, 2014 (JP) ................. 2014-072013

(51) Int. Cl.
*B62K 21/18* (2006.01)
*B62K 25/24* (2006.01)

(52) U.S. Cl.
CPC .............. *B62K 21/18* (2013.01); *B62K 25/24* (2013.01)

(58) Field of Classification Search
CPC .................. B62K 21/18; B62K 25/24
See application file for complete search history.

(56) References Cited

U.S. PATENT DOCUMENTS

| | | | | |
|---|---|---|---|---|
| 412,322 A * | 10/1889 | Copeland | ................ | B62L 3/00 280/264 |
| 468,643 A * | 2/1892 | Clement | ................ | B62K 25/04 280/275 |
| 913,961 A * | 3/1909 | Levedahl | ................ | B62K 25/24 280/276 |
| 946,143 A * | 1/1910 | Levedahl | ................ | B62K 25/08 267/173 |
| 1,268,918 A * | 6/1918 | Blanchard | ................ | B62K 7/00 280/202 |
| 2,550,876 A * | 5/1951 | Spencer | ................ | B62K 25/16 267/253 |
| 2,592,981 A * | 4/1952 | Violet | ................ | B62K 11/06 180/227 |
| 3,944,254 A * | 3/1976 | Inui | ................ | B62K 25/24 280/276 |

(Continued)

FOREIGN PATENT DOCUMENTS

JP 04-169386 A 6/1992

*Primary Examiner* — Anne Marie Boehler
*Assistant Examiner* — Gabriela C Craciun
(74) *Attorney, Agent, or Firm* — Westerman, Hattori, Daniels & Adrian, LLP

(57) ABSTRACT

A steering structure for a saddle type vehicle includes a head pipe which forms a steering axial line offset to a front side with respect to a steering axial line of a handlebar, a steering member supported for pivotal motion on the head pipe and configured to pivot around the steering axial line integrally with a front wheel, and a link member connected at a first end portion thereof for pivotal motion on the steering member and connected at a second end portion thereof for pivotal motion to the handlebar. The steering structure also includes a pivotal member provided between the first end portion of the link member and the steering member and supported on the steering member for rotation around a pivotal axial line extending along a center axial line of an axle of the front wheel.

7 Claims, 10 Drawing Sheets

(56) References Cited

U.S. PATENT DOCUMENTS

| | | | | |
|---|---|---|---|---|
| 4,108,460 A * | 8/1978 | Silva, Jr. | ............... | B62K 3/005 |
| | | | | 280/236 |
| 4,685,694 A * | 8/1987 | Kouyama | ............... | B62K 21/00 |
| | | | | 280/263 |
| 5,069,303 A * | 12/1991 | Fuller | ............... | B62K 25/24 |
| | | | | 180/219 |
| 5,069,467 A * | 12/1991 | Claudio | ............... | B62K 25/24 |
| | | | | 280/276 |
| 5,299,820 A * | 4/1994 | Lawwill | ............... | B62K 25/24 |
| | | | | 280/277 |
| 5,441,291 A * | 8/1995 | Girvin, III | ............... | B62K 25/24 |
| | | | | 267/293 |
| 5,599,034 A * | 2/1997 | Brigden | ............... | B62K 21/08 |
| | | | | 280/276 |
| 7,163,224 B1 * | 1/2007 | Song | ............... | B62K 11/14 |
| | | | | 280/276 |
| 7,896,379 B2 * | 3/2011 | Nagao | ............... | B62K 25/24 |
| | | | | 280/276 |
| 2008/0236925 A1 * | 10/2008 | Hasegawa | ............... | B62K 25/24 |
| | | | | 180/227 |
| 2014/0367942 A1 * | 12/2014 | Nesbitt, III | ............... | B62K 25/24 |
| | | | | 280/276 |
| 2014/0375015 A1 * | 12/2014 | Yu | ............... | B62K 5/027 |
| | | | | 280/267 |

\* cited by examiner

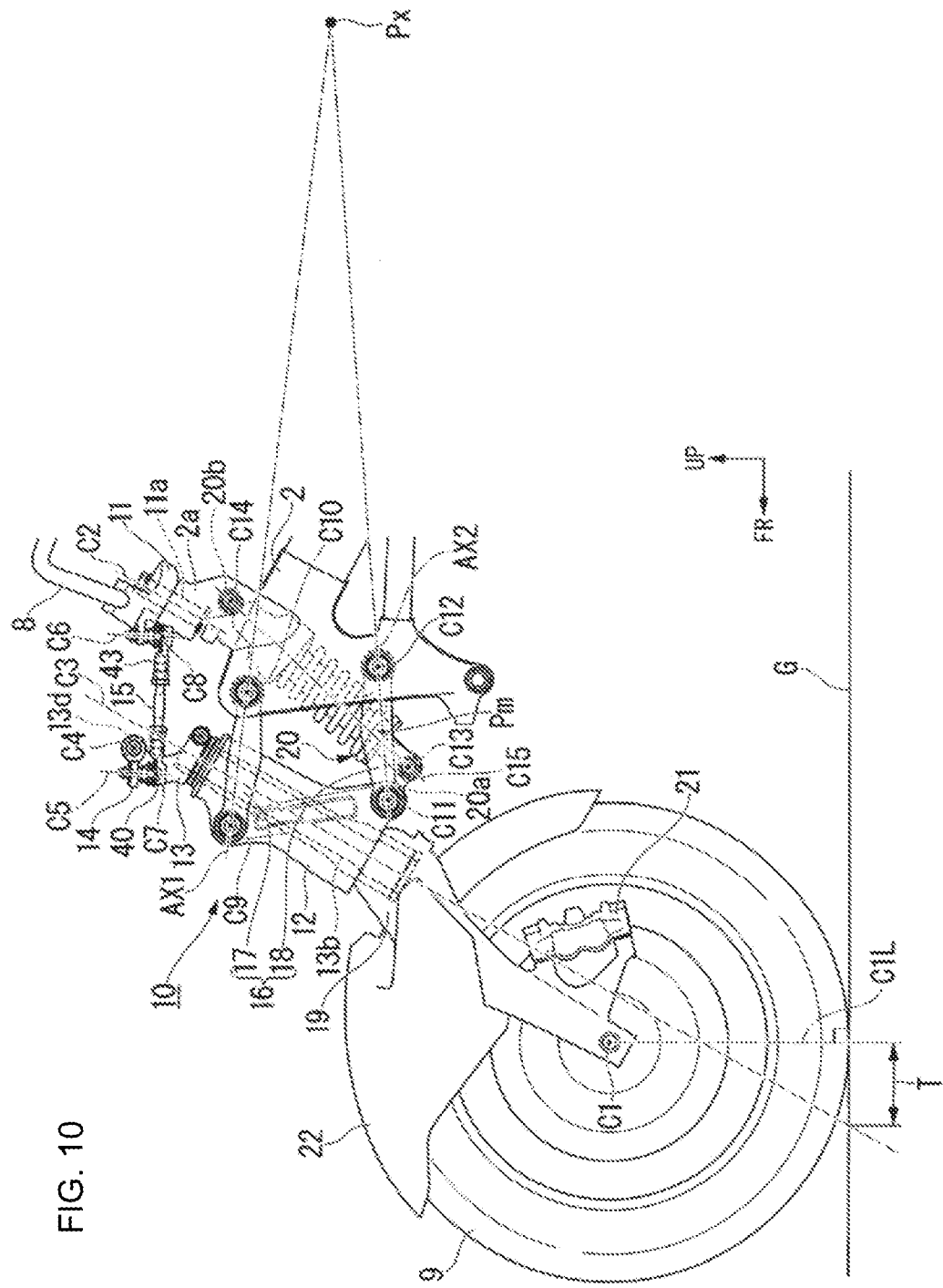

STEERING STRUCTURE FOR SADDLE TYPE VEHICLE

FIELD OF THE INVENTION

This application relates to a steering structure for a saddle type vehicle.

BACKGROUND OF THE INVENTION

One example of a conventional steering structure for a saddle type vehicle is disclosed in Japanese Patent Laid-Open No. Hei 4-169386 ("JP '386"). In the steering structure for a saddle type vehicle, a handlebar and a front wheel suspending member are connected to each other through an L-shaped bendable link mechanism. In the bendable link mechanism, upper and lower links are bent and stretched in response to upward and downward movements of a front wheel to connect the handlebar and the front wheel suspending member for steering movement also when the front wheel moves upwardly or downwardly.

SUMMARY OF THE INVENTION

One problem with the aforementioned structure of JP '386 is that since the bendable link mechanism includes a bendable and stretchable portion, it is disposed such that the link mechanism extends forwardly or rearwardly. Therefore, it is necessary to assure a space in which the bendable link mechanism is to be disposed.

Therefore, one objective of the present invention is to raise, in a steering structure for a saddle type vehicle wherein a handlebar and a front wheel suspending member are connected to each other through a link mechanism, the degree of freedom of the position of the handlebar while the influence of upward and downward movements of the front wheel suspending apparatus on steering is reduced.

To achieve the above-mentioned objective, one aspect of the present invention includes a head pipe (12) which forms a steering axial line (C3) offset to a front side with respect to a steering axial line (C2) of a handlebar (8), a steering member (13) supported for pivotal motion on the head pipe (12) and configured to pivot around the steering axial line (C3) integrally with a front wheel (9), a link member (15) connected at a first end portion thereof for pivotal motion on the steering member (13) and connected at a second end portion thereof for pivotal motion to the handlebar (8), and a pivotal member (14) provided between the first end portion of the link member (15) and the steering member (13) and supported on the steering member (13) for rotation around a pivotal axial line (C4) extending along a center axial line (C1) of an axle (9a) of the front wheel (9). Accordingly, by connecting the steering member and the handlebar to each other by the link member which can be pivoted at the opposite ends thereof, the steering mechanism wherein the handlebar is offset to the rear of the steering member can be configured. Further, even if an angle is generated between the steering axial line and the steering axial line by a stroke of the front wheel or the like, this angle can be absorbed also by pivotal motion of the pivotal member. In other words, in the steering structure for a saddle type vehicle wherein the handlebar and the front wheel suspension member are connected to each other by a link mechanism, the influence of upward and downward movement of the front wheel suspension apparatus on steering can be reduced and the degree of freedom of the handlebar position can be raised.

A second aspect of the present invention includes a pair of left and right link members (15) provided on the opposite sides in a vehicle widthwise direction, and the pivotal member (14) disposed in the proximity of a front end of the pair of left and right link members (15) between the pair of left and right link members (15). Accordingly, the pivotal member is disposed compactly, and therefore, the influence of the pivotal member on the layout in connection with peripheral members can be reduced.

A third aspect of the present invention includes a shaft supporting portion (13d) which supports the pivotal member (14) on the steering member (13) and is disposed on an upper side of the link member (15) as viewed in side elevation. Accordingly, the shaft supporting portion is disposed compactly, and therefore, the influence of the shaft supporting portion on the layout in connection with peripheral members can be reduced.

A fourth aspect of the present invention includes an upper arm portion (17) connected at a front end portion (17a) thereof to the head pipe (12) for rocking motion around a first connection axial line (C9) extending along a vehicle widthwise direction and connected at a rear end portion (17b) thereof to a vehicle body frame (1) for rocking motion around a second connection axial line (C10) extending along the vehicle widthwise direction, and a lower arm portion (18) disposed below the upper arm portion (17) and connected at a front end portion (18a) thereof to the head pipe (12) for rocking motion around a third connection axial line (C11) extending along the vehicle widthwise direction and connected at a rear end portion (18b) thereof to the vehicle body frame (1) for rocking motion around a fourth connection axial line (C12) extending along the vehicle widthwise direction, wherein a first straight line (AX1) which passes the first connection axial line (C9) and the second connection axial line (C10) as viewed in side elevation and a second straight line (AX2) which passes the third connection axial line (C11) and the fourth connection axial line (C12) as viewed in side elevation cross with each other at forward or rearward extension portions thereof. Accordingly, even if the steering member carries out a stroke movement including an inclination with respect to the steering axial line by rocking motion through the upper arm portion and the lower arm portion disposed with an angle therebetween as viewed in side elevation, the stroke can be absorbed by pivotal motion of the pivotal member.

BRIEF DESCRIPTION OF THE DRAWINGS

The present invention will be described with reference to the accompanying drawings, wherein:

FIG. 10 is a left side elevational view depicting an example in which a first straight line and a second straight line of the front wheel suspension apparatus cross with each other.

DETAILED DESCRIPTION OF THE INVENTION

In the following, an embodiment of the present invention is described with reference to the drawings. It is to be noted that, unless otherwise specified, the directions such as forward, rearward, leftward and rightward directions in the following description are same as those of a vehicle described below. Further, at suitable locations in the figures referred to in the following description, an arrow mark FR indicative of the forward direction of the vehicle, another arrow mark LH indicative of the leftward direction of the vehicle, a further arrow mark UP indicative of an upward direction of the vehicle and a left-right center line CL of the vehicle are depicted.

Figure 1:
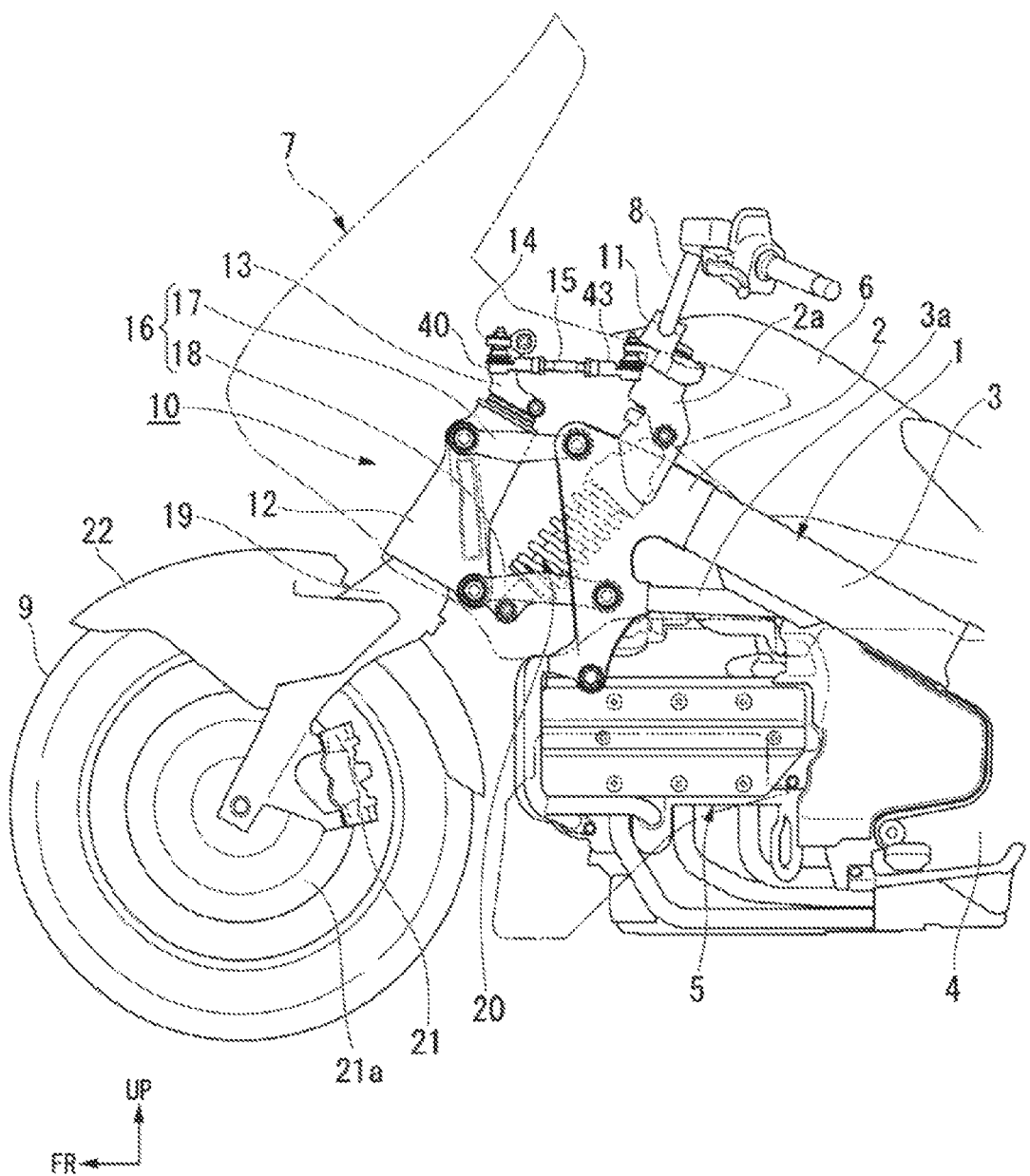
FIG. 1 is a left side elevational view of a front portion of a vehicle body of a motorcycle according to an embodiment of the present invention.

FIG. 1 depicts a front portion of a vehicle body of a motorcycle as an example of a saddle type vehicle. Referring to FIG. 1, a vehicle body frame 1 of the motorcycle has a front block 2 which supports a front wheel suspension apparatus 10 at a front end portion thereof.

Behind the front block 2, a pair of left and right main frames 3 extend rearwardly downwardly and a pair of left and right sub frames 3a extend rearwardly. The left and right main frames 3 are connected to a pivot frame 4 which supports a rear wheel suspension apparatus not depicted. Below the front block 2, left and right main frames 3 and left and right sub frames 3a, an engine 5, for example, of the horizontally opposed type is mounted. Above the front block 2 and the left and right main frames 3, a fuel tank 6 is disposed. The vehicle body of the motorcycle is covered at a front portion thereof with a front cowl 7 made of synthetic resin.

Figure 2:
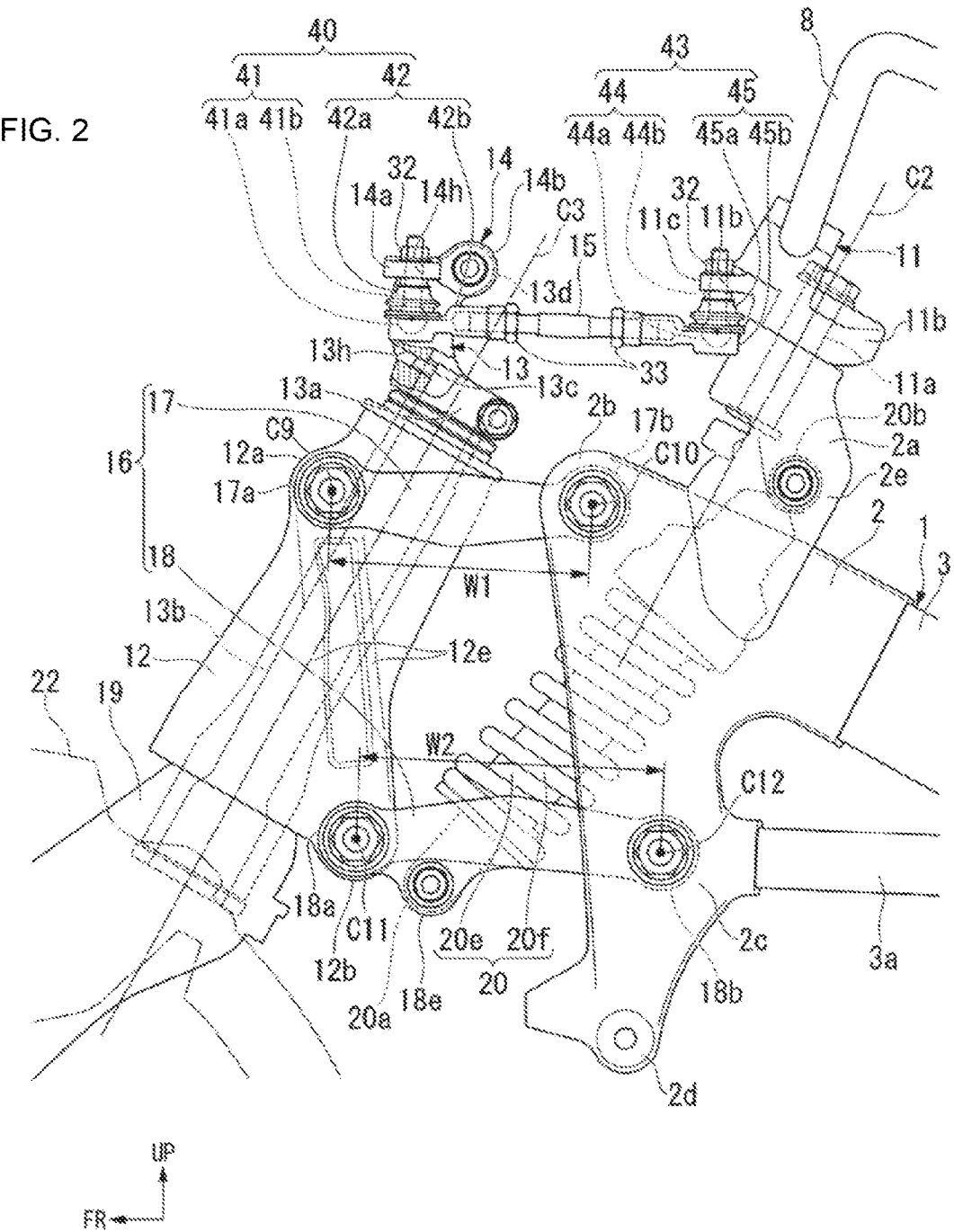
FIG. 2 is a left side elevational view depicting a front wheel suspension apparatus of the motorcycle.
Figure 3:
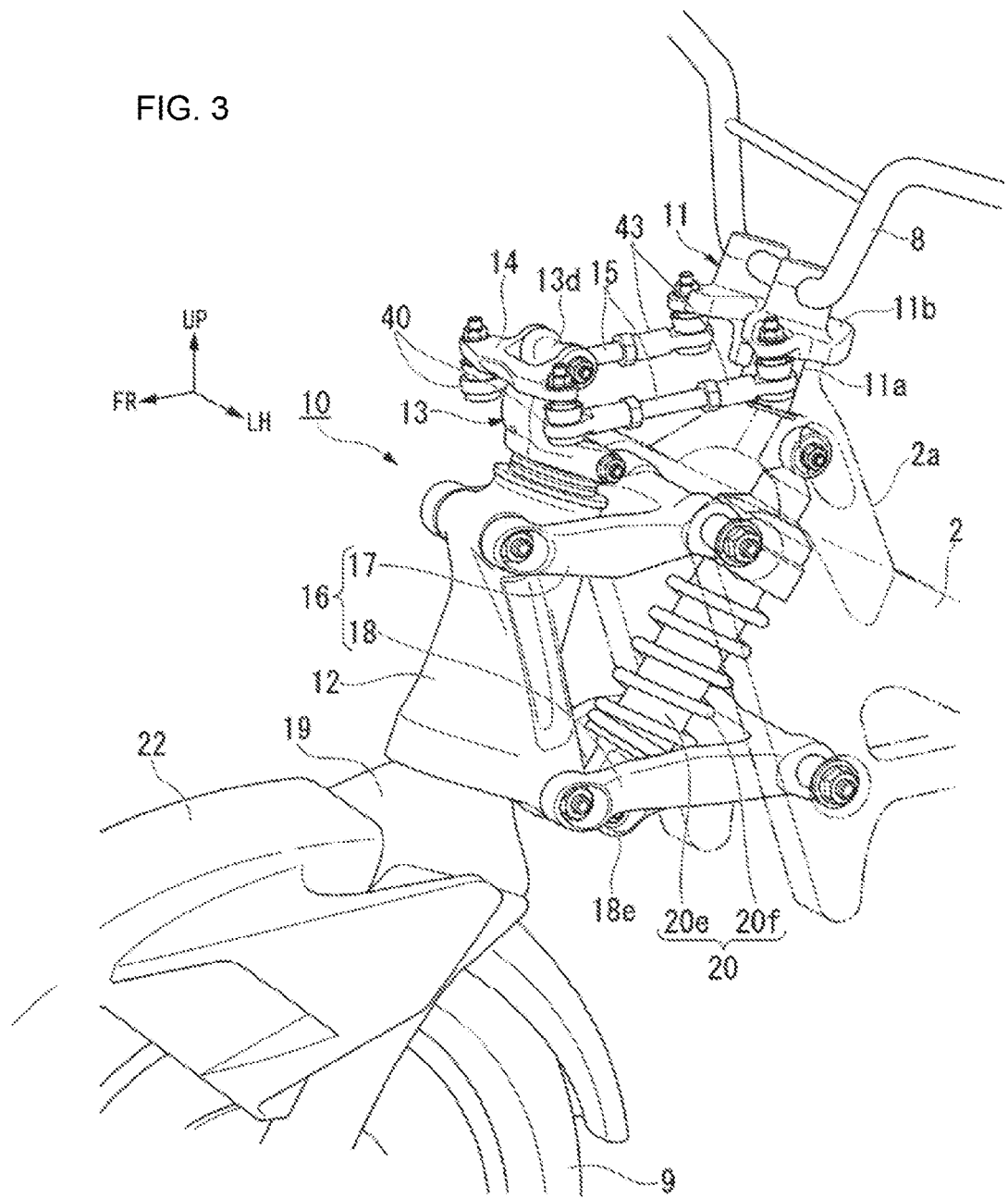
FIG. 3 is a perspective view depicting the front wheel suspension apparatus as viewed from a left upper direction.

Referring to FIGS. 2 and 3, the front block 2 has a V shape projecting forwardly upwardly as viewed in side elevation. A connection portion 2b is formed at a front upper end portion of the front block 2, and a rear end portion 17b of an upper arm portion 17 hereinafter described is connected to the connection portion 2b. A connection portion 2c is formed in the proximity of the center of the front block 2 in the upward and downward direction, and a rear end portion 18b of a lower arm portion 18 hereinafter described is connected to the connection portion 2c.

A supporting portion 2d is formed at a front lower end portion of the front block 2, and the engine 5 is supported at left and right side portions thereof on the supporting portion 2d.

The front wheel suspension apparatus 10 includes a supporting portion 2a, a handlebar post 11, a head pipe 12, a steering member 13, a pivotal member 14, link members 15, a rockable arm 16, a front fork 19, and a cushion unit 20.

Figure 8:
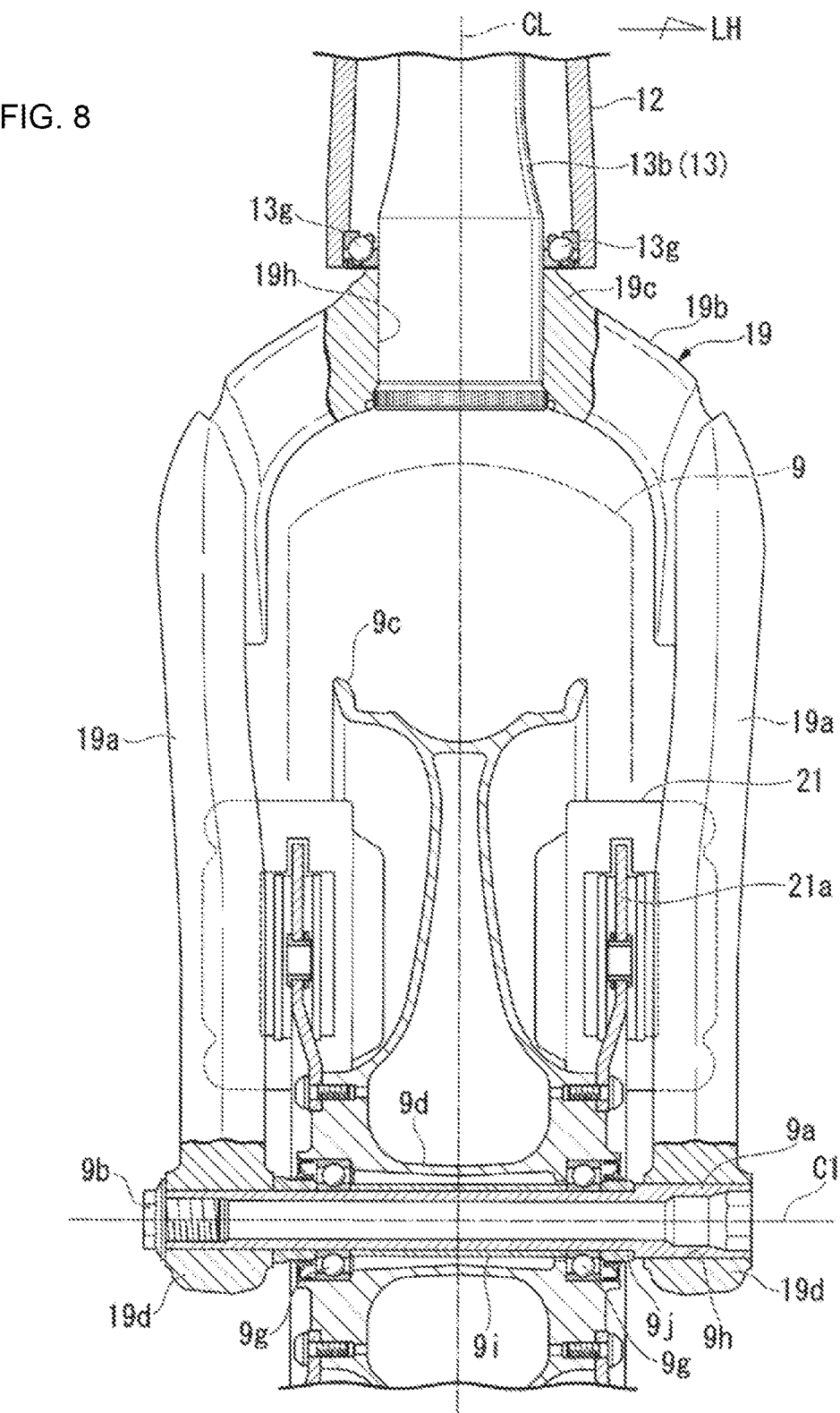
FIG. 8 is a sectional view including a cross section taken along a longitudinal direction of a head pipe of a connection portion at an upper end portion of a front fork of the front wheel suspension apparatus and a cross section taken along a center axial line of a front wheel axle.
Figure 9:
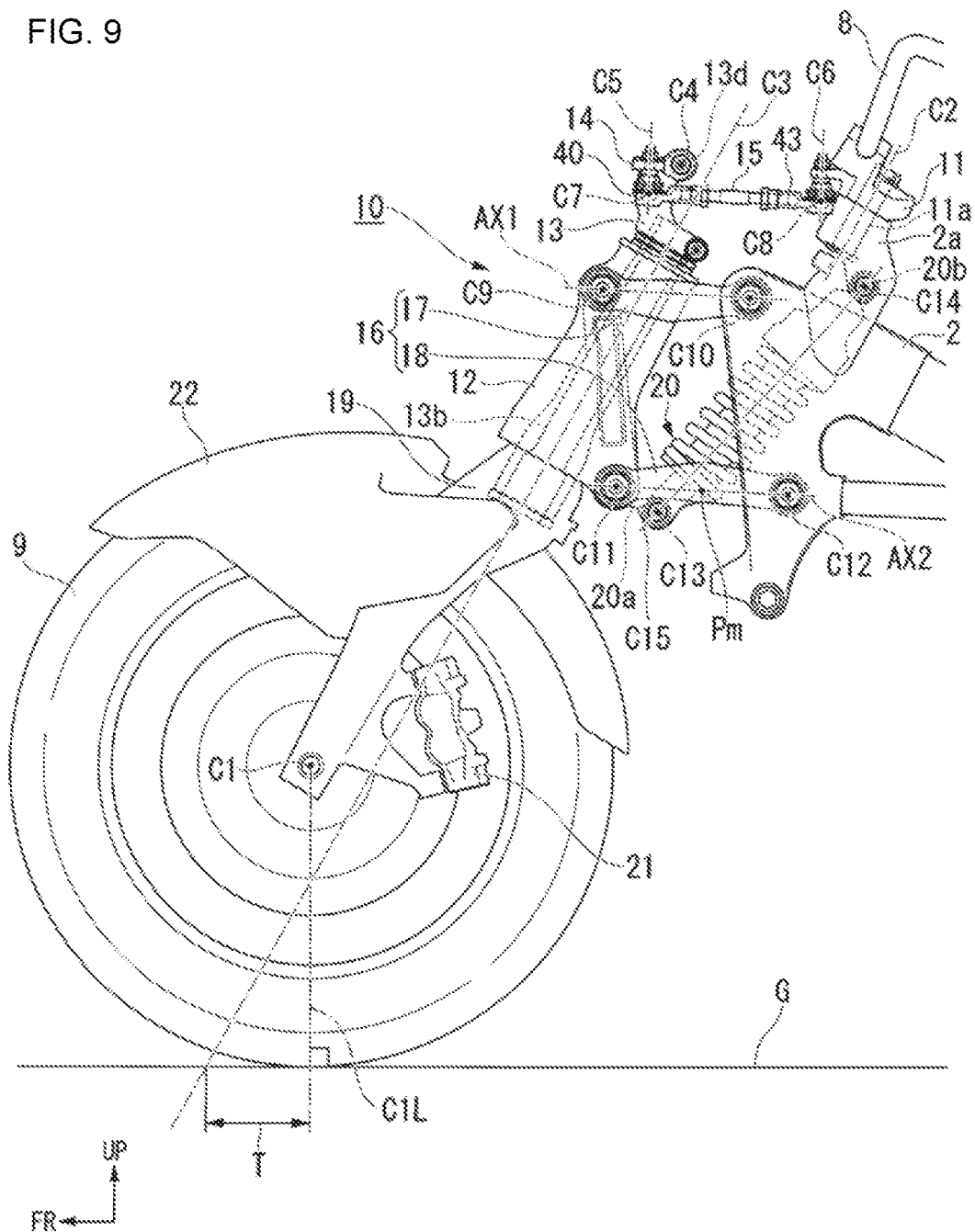
FIG. 9 is a left side elevational view depicting various axial lines and so forth of the front wheel suspension apparatus.

Referring to FIGS. 8 and 9, the front fork 19 is disposed below the head pipe 12. The front fork 19 is connected at an upper end portion thereof to a shaft portion 13b of the steering member 13 and supports, at a lower end portion thereof, an axle (front wheel axle) 9a of a front wheel 9.

The front fork 19 integrally has a pair of left and right arm portions 19a extending upwardly and downwardly and a cross member 19b which connects upper end portions of the left and right arm portions 19a to each other. The components of the front fork 19 are parts made of aluminum and each formed as a unitary member, and the parts are coupled to each other into a unitary member by welding.

The left and right arm portions 19a are disposed on the opposite left and right sides of the front wheel 9. The cross member 19b is curved to the inner side in the vehicle widthwise direction so as to extend along a tread plane at an upper end portion of the front wheel 9 and is disposed between upper end portions of the left and right arm portions 19a. The cross member 19b is joined at left and right end portions thereof to upper end portions of the left and right arm portions 19a.

A connection portion 19c is formed at an upper end portion of the cross member 19b, and the steering member 13 is connected at the shaft portion 13b thereof to the connection portion 19c. An insertion hole 19h is formed at the connection portion of the cross member 19b and is open in a direction in which the shaft portion 13b of the steering member 13 extends. The shaft portion 13b of the steering member 13 has a maximum diameter at a lower end portion thereof. By coupling the lower end portion of the shaft portion 13b and the front fork 19 to each other by welding in a state in which the shaft portion 13b is fitted from an upper end portion thereof in the cross member 19b and a lower end portion of the shaft portion 13b is positioned in the insertion hole 19h, the upper end portion of the front fork 19 is fixedly connected to the shaft portion 13b of the steering member 13.

It is to be noted that reference character 13g in the figure denotes a ball bearing held on an inner circumference of a lower end portion of the head pipe 12.

A connection portion 19d is formed at a lower end portion of the left and right arm portions 19a, and the front wheel axle 9a is connected to the connection portions 19d. An insertion portion 9h is formed in the connection portion 19d of the left and right arm portions 19a and is open in the vehicle widthwise direction. In a state in which a hub portion 9d of a wheel 9c of the front wheel 9 is sandwiched between the connection portions 19d of the left and right arm portions 19a, a bolt 9b is screwed into and tightened to one end of the front wheel axle 9a through an inner circumference of the insertion portion 9h and the hub portion 9d of the wheel 9c. A pair of left and right side collars 9j, a pair of left and right ball bearings 9g and a center collar 9i are provided on an outer circumference of the front wheel axle 9a. The ball bearings 9g are adjacent to the inner sides of the left and right side collars 9j. The center collar 9i is provided to assure a distance between the left and right ball bearings 9g. The front wheel axle 9a is fixedly supported at the opposite end portions thereof in the vehicle widthwise direction at lower end portions of the front fork 19 through the left and right ball bearings 9g. Further, the wheel 9c of the front wheel 9 is supported for rotation at the center of the front wheel axle 9a in the vehicle widthwise direction.

It is to be noted that reference character 21a denotes a brake rotor wherein an inner rotor is fixed to the opposite left and right ends of the hub portion 9d. Further, reference character C1 in the figures denotes a center axial line of the front wheel axle 9a. Furthermore, reference character C1L in the figure denotes a perpendicular line extending from the center axial line C1 to the ground surface G. Further, reference character T in the figures denotes a trail.

A brake caliper 21 is supported behind a lower portion (left and right arm portions 19a) of the front fork 19. A front fender 22 is supported at an upper portion (cross member 19b) of the front fork 19 through a bolt not depicted.

Referring to FIGS. 2, 3 and 9, the supporting portion 2a is provided in a rearwardly inclined state with respect to the vertical direction at the center of an upper end portion of the front block 2 in the forward rearward direction as viewed in side elevation. The supporting portion 2a is provided integrally at an upper front end portion of the front block 2 made of, for example, aluminum. The supporting portion 2a supports, at an upper portion thereof, the handlebar post 11 for pivotal motion (for steering motion) and supports, at a lower portion thereof, a rear upper end portion 20b of the cushion unit 20 for rocking motion.

In particular, the supporting portion 2a has a shaft portion 11a of the handlebar post 11 fitted in an inner circumference of an upper portion thereof and supports the shaft portion 11a for rotation (for steering operation). A ball bearing not depicted is held on an inner circumference of the supporting portion 2a. An upper end portion of the shaft portion 11a projects above the supporting portion 2a and fixedly supports, at the projection thereof, a holder 11b of the handlebar post 11. A pair of left and right connection portions 2e are formed on the opposite sides in the vehicle widthwise direction of a lower portion of the supporting portion 2a, and the rear upper end portion 20b of the cushion unit 20 is connected to the connection portions 2e.

It is to be noted that reference character C2 in the figures denotes a center axial line of the shaft portion 11a. In the following description, the center axial line C2 is sometimes referred to as steering axial line.

Figure 5:
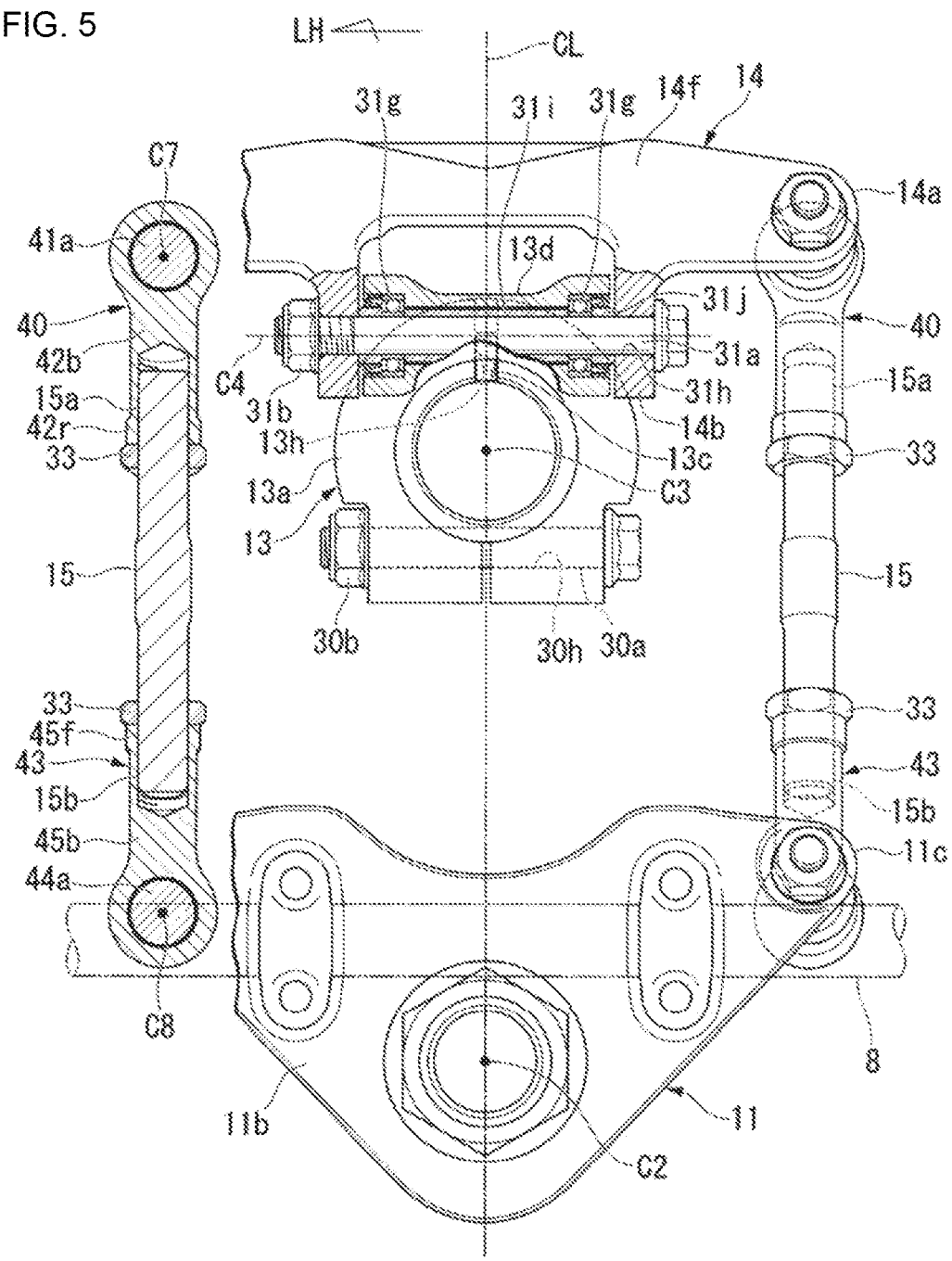
FIG. 5 is a sectional view including a cross section taken along an axial line of rotation of the front wheel suspension apparatus and a horizontal cross section of a left link member.

Referring to FIG. 5, the handlebar post 11 has a rearwardly projecting V shape as viewed in a direction along the steering axial line C2. A handlebar 8 is fixedly supported at a central portion thereof in the leftward and rightward direction on the holder 11b of the handlebar post 11. Referring to FIG. 2, the handlebar post 11 is supported at the shaft portion 11a thereof for rotation on the supporting portion 2a such that the handlebar 8 is supported for pivotal motion (steering motion) to the handlebar post 11 around the shaft portion 11a (steering axial line C2) above the supporting portion 2a. A connection portion 11c is formed at left and right end portions of the handlebar post 11, and left and right second ball joints 43 hereinafter described are connected to the connection portions 11c.

Referring to FIGS. 2, 8 and 9, the head pipe 12 is provided in front of and in a spaced relationship from the steering axial line C2. In particular, the head pipe 12 has a cylindrical shape and is provided in a rearwardly inclined relationship with respect to the vertical direction in front of the supporting portion 2a (front block 2). The head pipe 12 supports, on the inner side in a diametrical direction thereof, the shaft portion 13b of the steering member 13 for rotation (steering motion) around a center axial line C3 of the shaft portion 13b. A connecting portion 12a is formed in a forwardly upwardly projecting manner at a front upper portion of the head pipe 12, and a front end portion 17a of the upper arm portion 17 is connected to the connection portion 12a. A connection portion 12b is formed in a rearwardly downwardly projecting manner at a rear lower portion of the head pipe 12, and a front end portion 18a of the lower arm portion 18 is connected to the connection portion 12b.

It is to be noted that the center axial line C3 of the shaft portion 13b coincides with the center axial line of the head pipe 12. In the following description, the center axial line C3 is sometimes referred to as steering axial line. The angle of the steering axial line C3 with respect to the vertical direction is "caster angle." The steering axial line C3 is offset (spaced) forwardly from the steering axial line C2. In a 1G state in which a load corresponding to the vehicle weight is applied to the front wheel suspension apparatus 10 in the figures (the state is hereinafter simply referred to sometimes as "1G state"), the steering axial line C3 and the steering axial line C2 extend in parallel to each other.

Referring to FIGS. 2 and 5, the steering member 13 is supported for pivotal motion on the head pipe 12 and is steered around the steering axial line C3 integrally with the front wheel 9. The steering member 13 has an upper portion 13a and the shaft portion 13b. The upper portion 13a has a C shape whose front portion is swollen forwardly as viewed in side elevation. The shaft portion 13b extends along a direction in which the head pipe 12 extends.

A lower end portion of the upper portion 13a has a C shape which is open on the rear side as viewed in a direction along the steering axial line C3. An insertion hole 13h is formed at a front lower end portion of the upper portion 13a, and a pin 13c for positioning is inserted in the insertion hole 13h. An insertion hole 30h is formed at a rear lower end portion of the upper portion 13a such that it is open in the vehicle widthwise direction. By screwing and tightening a bolt 30a into and to a nut 30b through the insertion hole 30h in a state in which the pin 13c is inserted in the insertion hole 13h, a lower end portion of the upper portion 13a is fastened and fixed to an upper end portion of the shaft portion 13b.

Referring to FIGS. 2, 4, 5 and 9, a shaft supporting portion 13d is formed at an upper end portion of the upper portion 13a. The shaft supporting portion 13d has a shape of a cylinder extending in the vehicle widthwise direction. The shaft supporting portion 13d is disposed on the upper side of the left and right link members 15 as viewed in side elevation. The pivotal member 14 is supported for pivotal motion coaxially with the shaft supporting portion 13d on the shaft supporting portion 13d.

It is to be noted that reference character C4 in the figures denotes a center axial line of the shaft supporting portion 13d. In the following description, the center axial line C4 is sometimes referred to as pivotal axial line.

The pivotal member 14 is provided between a front end portion of the left and right link members 15 and the steering member 13. The pivotal member 14 is disposed in the proximity of the front end of the left and right link members 15 between the left and right link members 15. The pivotal member 14 is disposed on the upper side of the left and right link members 15.

Figure 4:
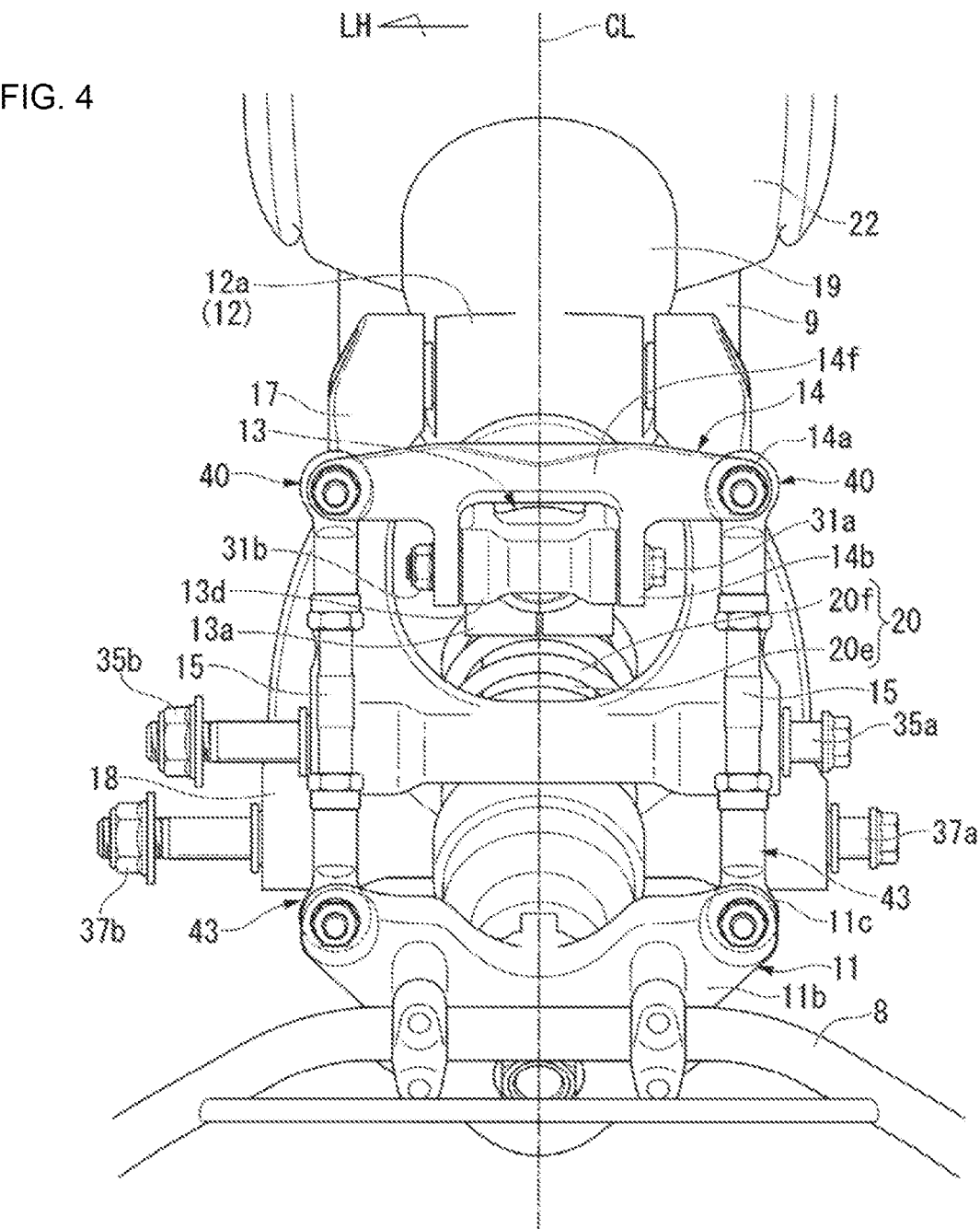
FIG. 4 is a top plan view of the front wheel suspension apparatus.

Referring to FIG. 4, the pivotal member 14 extends in the vehicle widthwise direction such that it has a width equal to that of the handlebar post 11 as viewed in top plan. The pivotal member 14 has a main body portion 14f positioned at a front portion thereof, and a pair of left and right extensions 14b extending rearwardly in a spaced relationship by a predetermined distance from each other on the inner side of the main body portion 14f in the vehicle widthwise direction. A connection portion 14a is formed at left and right rear end portions of the main body portion 14f, and left and right first ball joints 40 hereinafter described are connected to the connection portions 14a.

Referring also to FIG. 5, an insertion hole 31*h* is formed in the left and right extensions 14*b* of the pivotal member 14 such that it is open in the vehicle widthwise direction. In a state in which the cylindrical shaft supporting portion 13*d* is sandwiched between the left and right extensions 14*b*, a bolt 31*a* is inserted through the insertion hole 31*h* and an inner circumference of the shaft supporting portion 13*d*, and a nut 31*b* is screwed into and tightened to the projecting portion of the bolt 31*a*. On an outer circumference of the bolt 31*a*, a pair of left and right side collars 31*j*, a pair of left and right ball bearings 31*g* and a center collar 31*i* are provided. The ball bearings 31*g* are positioned on the inner side of and adjacent the left and right side collars 31*j*. The center collar 31*i* is provided to assure a distance between the left and right ball bearings 31*g*. The pivotal member 14 is supported for pivotal motion around the pivotal axial line C4 at the shaft supporting portion 13*d* of the steering member 13 by the left and right ball bearings 31*g*.

Referring to FIGS. 2, 4 and 5, the left and right link members 15 are provided in pair on the opposite sides in the vehicle widthwise direction. The left and right link members 15 extend substantially linearly in the forward and rearward direction of the vehicle as viewed in top plan and are juxtaposed in parallel to each other in the vehicle widthwise direction. The left and right link members 15 are connected at a front end portion thereof on the steering member 13 side for pivotal motion around a first axial line C5 hereinafter described and are connected at a rear end portion thereof on the side of the handlebar 8 for pivotal motion around a second axial line C6 hereinafter described.

In particular, the left and right first ball joints 40 are provided in pair on the opposite sides in the vehicle widthwise direction and connected to a front end portion of the left and right link members 15. To a rear end portion of the left and right link members 15, the left and right second ball joints 43 provided in pair on the opposite sides in the vehicle widthwise direction are connected. The left and right link members 15 are connected at a front end portion thereof for pivotal motion to the left and right connection portions 14*a* of the pivotal member 14 through the left and right first ball joints 40. Further, the left and right link members 15 are connected at a rear end portion thereof for pivotal motion to the left and right connection portions 11*c* of the handlebar post 11 through the left and right second ball joints 43.

The left and right first ball joints 40 individually have a first ball stud 41 and a first socket 42.

The left and right first ball studs 41 individually have a ball portion 41*a* of a spherical shape and a stud portion 41*b* projecting to a location above the ball portion 41*a*. The left and right ball portions 41*a* are held for sliding movement in the inside of the left and right first sockets 42. The left and right stud portions 41*b* extend linearly in the upward and downward direction of the vehicle.

The left and right first sockets 42 individually have a first upper socket 42*a* and a first lower socket 42*b*. The ball portion 41*a* is held for sliding movement between the first upper sockets 42*a* and the first lower sockets 42*b*.

An insertion hole 14*h* is formed at the left and right connection portions 14*a* of the pivotal member 14 such that it is open in the upward and downward directions of the vehicle. By inserting threaded portions at an upper end portion of the left and right stud portions 41*b* into the left and right insertion holes 14*h* and screwing and tightening a nut 32 into and to the upper protection of the left and right stud portions 41*b*, the left and right stud portions 41*b* are fixedly fastened to the left and right connection portions 14*a* of the pivotal member 14.

It is to be noted that reference character C5 in the figure denotes a center axial line of the left and right stud portions 41*b*. In the following description, the center axial line C5 is sometimes referred to as first axial line. The first axial line C5 is a straight line extending in the upward and downward direction of the vehicle. Meanwhile, reference character C7 in the figure denotes the center of the left and right ball portions 41*a*. The center C7 of the left and right ball portion 41*a* serves as the center of rotation of the left and right first ball joints 40.

The left and right first ball studs 41 individually have a second ball stud 44 and a second socket 45.

The left and right second ball studs 44 individually have a spherical ball portion 44*a* and a stud portion 44*b* projecting upwardly from the ball portion 44*a*. The left and right ball portions 44*a* are held for sliding movement in the inside of the left and right second sockets 45. The left and right stud portions 44*b* extend in parallel to the left and right stud portions 41*b* and extend linearly in the upward and downward direction of the vehicle.

The left and right second sockets 45 individually have a second upper socket 45*a* and a second lower socket 45*b*. The ball portion 44*a* is held for sliding movement between the second upper socket 45*a* and the second lower socket 45*b*.

An insertion hole 11*h* is formed in the left and right connection portions 11*c* of the handlebar post 11 such that it is open in the upward and downward direction of the vehicle. By inserting threaded portions at an upper end portion of the left and right stud portions 44*b* into the left and right insertion holes 11*h* and screwing and tightening a nut 32 into and to the upper projection of the left and right stud portions 44*b*, the left and right stud portions 44*b* are fixedly fastened to the left and right connection portions 11*c* of the handlebar post 11.

It is to be noted that reference character C6 in the figure denotes a center axial line of the left and right stud portions 44*b*. In the following description, the center axial line C6 is sometimes referred to as second axial line. The second axial line C6 is a straight line extending in parallel to the first axial line C5 in the upward and downward direction of the vehicle. Meanwhile, reference character C8 in the figure denotes the center of the left and right ball portions 44*a*. The center C8 of the left and right ball portions 44*a* serves as the center of rotation of the left and right second ball joints 43.

The left and right link members 15 are connected at a front end portion thereof to a rear end portion 42*r* of the left and right first lower sockets 42*b* and connected at a rear end portion thereof to a front end portion 45*f* of the left and right second lower sockets 45*b*. In particular, the left and right link members 15 are fixed using a lock nut 33 in a state in which a threaded portion 15*a* at a front end portion thereof is screwed by a predetermined amount into the rear end portion 42*r* of the left and right first lower sockets 42*b*. Further, the left and right link members 15 are fixed using another lock nut 33 in a state in which a threaded portion 15*b* at a rear end portion thereof is screwed by a predetermined amount into the front end portion 45*f* of the left and right second lower sockets 45*b*. The distance between the front and rear connection portions of the left and right link members 15 is adjustable by loosening the lock nut 33 and increasing or decreasing the screwed amount between the left and right first lower sockets 42*b* and front threaded portion 15*a* as well as between the left and right second lower sockets 45*b* and rear threaded portion 15*b*.

The left and right link members 15 form a parallel link together with the pivotal member 14 and the handlebar post 11 as viewed in a direction indicated by an arrow mark along the steering axial line C2 and the steering axial line C3. Therefore, the front wheel 9 can be steered by an angle equal to the steering angle of the handlebar 8. Further, by the left and right link members 15, the steering operation of the handlebar 8 and the steering operation of the steering member 13 interlock linearly.

Referring to FIGS. 2, 3 and 9, the rockable arm 16 is supported at a front end portion thereof for rocking motion on the head pipe 12 and is supported at a rear end portion thereof for rocking motion on the front block 2. The rockable arm 16 has a pair of upper and lower arm portions 17 and 18. The arm portions 17 and 18 are disposed in a juxtaposed relationship in the upward and downward direction of the vehicle and extend along the forward and rearward direction of the vehicle.

Front and rear end portions 17a and 17b of the upper arm portion 17 of the rockable arm 16 are disposed in front of the respective front and rear end portions 18a and 18b of the lower arm portion 18. The rockable arm 16 is supported at the front end portion 17a of the upper arm portion 17 thereof in front of the steering axial line C3 and supported at the front end portion 18a of the lower arm portion 18 thereof behind the steering axial line C3. The rockable arm 16 is disposed at the front end portion 17a of the upper arm portion 17 lower than an upper end of the head pipe 12 and disposed at the front end portion 18a of the lower arm portion 18 in the proximity of a lower end of the head pipe 12.

Figure 6:
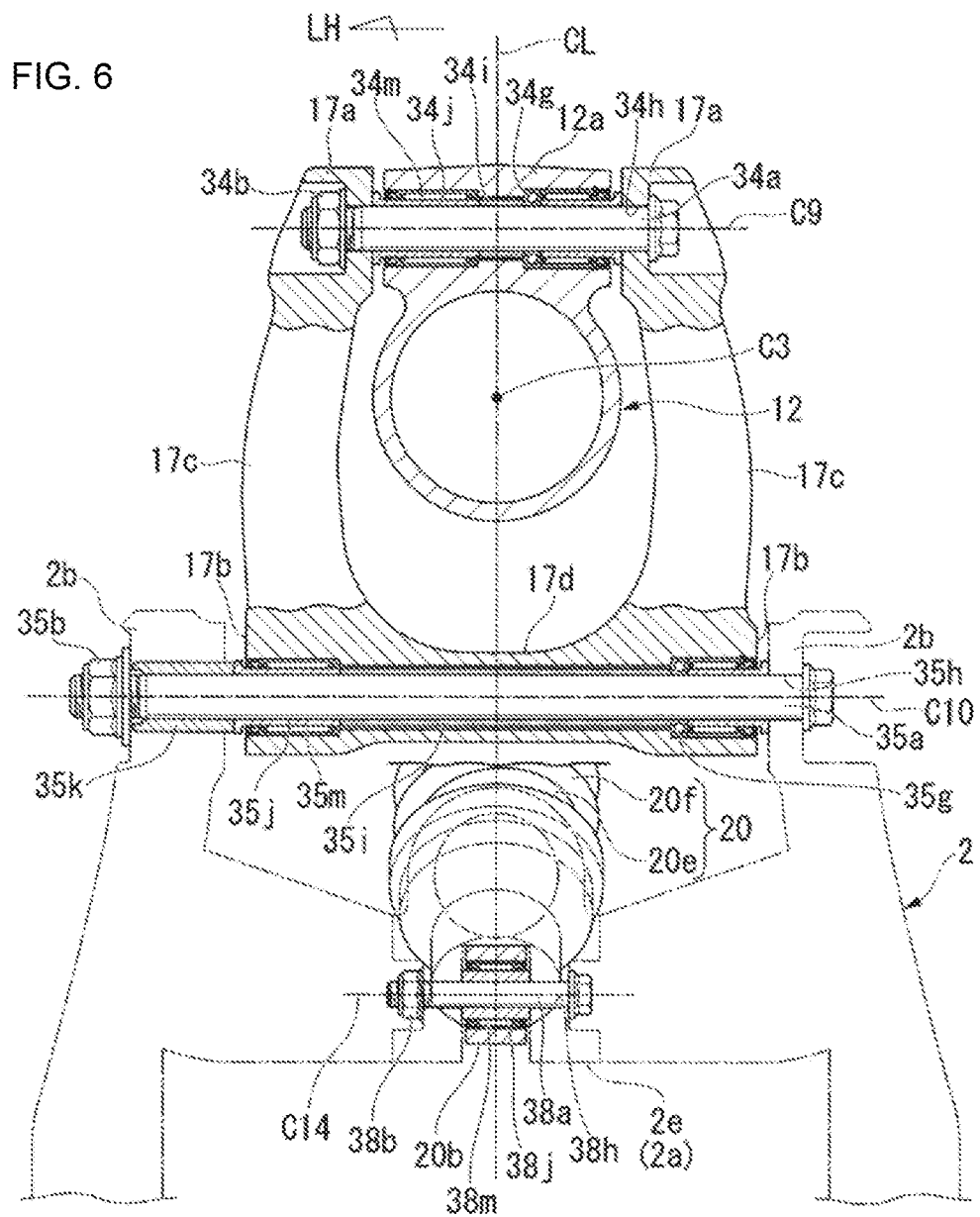
FIG. 6 is a sectional view including a cross section taken along a first connection axial line and a cross section taken along a second connection axial line of an upper arm portion of the front wheel suspension apparatus.

Referring also to FIG. 6, the upper arm portion 17 is supported at the front end portion 17a thereof for rocking motion on the connection portion 12a of the head pipe 12 through a bolt 34a as a connection member extending along the vehicle widthwise direction. Further, the upper arm portion 17 is supported at the rear end portion 17b thereof for rocking motion on the connection portion 2b of the front block 2 through a bolt 35a as a connection member extending along the vehicle widthwise direction.

The upper arm portion 17 integrally has a pair of left and right arm main bodies 17c extending forwardly and rearwardly, and a cross member 17d which connects the rear end portions 17b of the left and right arm main bodies 17c to each other. The elements of the upper arm portion 17 are individually a unitary part, for example, of aluminum and are integrally coupled by welding.

The left and right arm main bodies 17c are disposed on the opposite left and right sides of an upper portion of the head pipe 12. The left and right arm main bodies 17c are curved to the inner side in the vehicle widthwise direction so as to extend along outer wall faces of an upper portion of the head pipe 12.

The cross member 17d extends in the vehicle widthwise direction behind an upper portion of the head pipe 12. The cross member 17d is joined at the opposite end portions thereof to the rear end portions 17b of the left and right arm main bodies 17c.

An insertion hole 34h is formed at the front end portion 17a of the left and right arm main bodies 17c such that it is open in the vehicle widthwise direction. In a state in which the connection portion 12a of the head pipe 12 is sandwiched between the front end portions 17a of the left and right arm main bodies 17c, a bolt 34a is screwed into and tightened to a nut 34b through the insertion hole 34h and an inner circumference of the connection portion 12a. On the outer circumference of the bolt 34a, a pair of left and right side collars 34j, a center collar 34i and a ball bearing 34g are provided. The side collars 34j are provided to support a pair of left and right needle bearings 34m. The center collar 34i is provided to assure a distance between the left and right side collars 34j. The ball bearing 34g is acted upon by thrust through the right side collar 34j and the center collar 34i. The upper arm portion 17 is supported at the front end portion 17a thereof for rocking motion on the connection portion 12a through the left and right side collars 34j, center collar 34i and ball bearing 34g.

It is to be noted that reference character C9 in the figure denotes a center axial line of the bolt 34a. The center axial line C9 is sometimes referred to as first connection axial line.

An insertion hole 35h is formed in the left and right connection portions 2b of the front block 2 such that it is open in the vehicle widthwise direction. An adjust collar 35k is provided at the left connection portion 2b of the front block 2 for adjusting the left and right gaps. In a state in which the rear end portion 17b of the upper arm portion 17 (rear end portion 17b of the left and right arm main bodies 17c and the cross member 17d) is sandwiched between the left and right connection portions 2b of the front block 2, a bolt 35a is screwed into and tightened to a nut 35b through the insertion hole 35h and the rear end portion 17b of the upper arm portion 17. On an outer circumference of the bolt 35a, a pair of left and right side collars 35j, a center collar 35i and a ball bearing 35g are provided. The side collars 35j are provided to support a pair of left and right needle bearings 35m. The center collar 35i is provided to assure a distance between the left and right side collars 35j. The ball bearing 35g is acted upon by thrust through the right side collar 35j and the center collar 35i. The upper arm portion 17 is supported at the rear end portion 17b thereof for rocking motion on the left and right connection portion 2b through the left and right side collars 35j, center collar 35i and ball bearing 35g.

It is to be noted that reference character C10 in the figure denotes a center axial line of the bolt 35a. In the following description, the center axial line C10 is sometimes referred to as second connection axial line.

Figure 7:
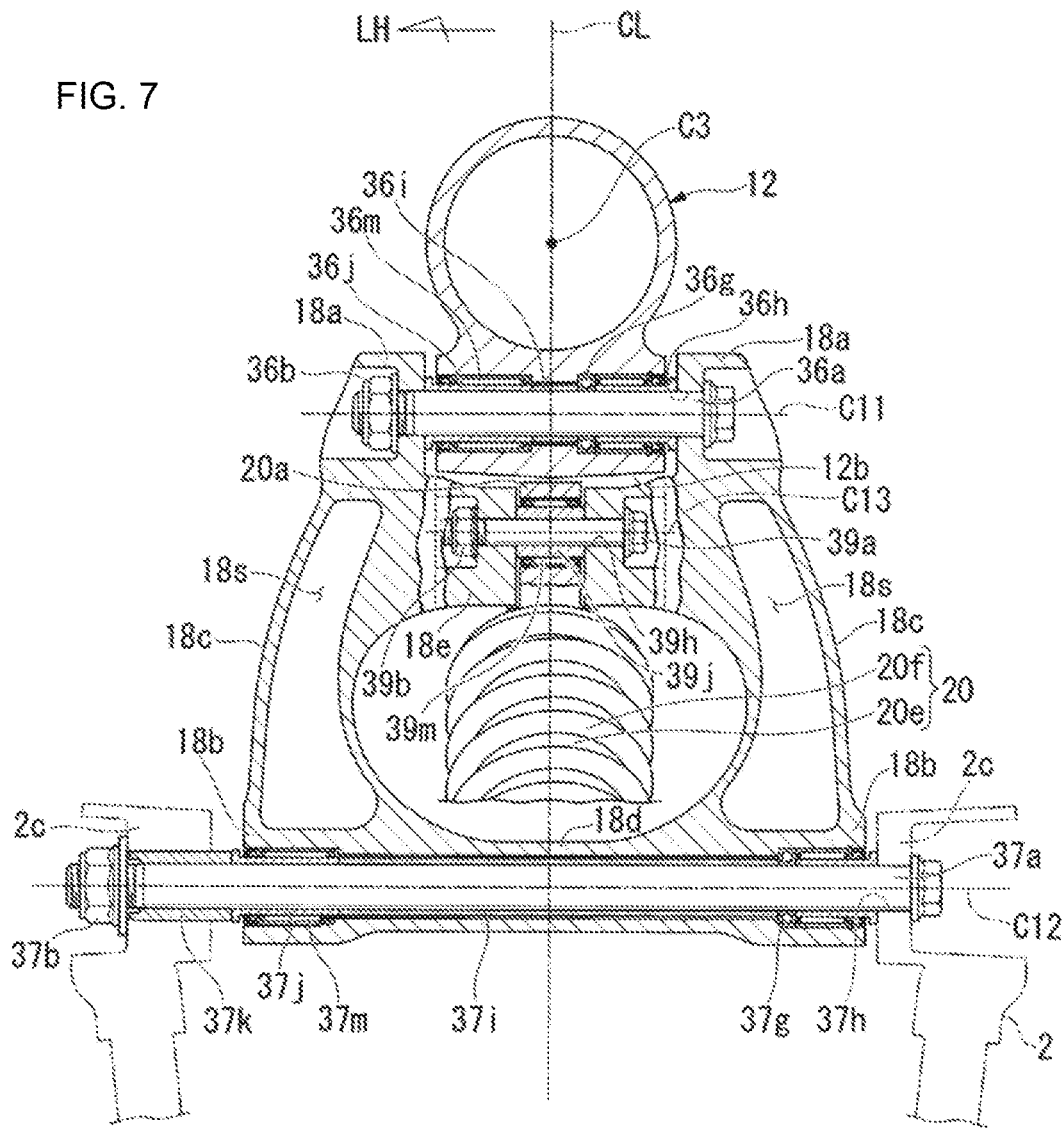
FIG. 7 is a sectional view including a cross section taken along a third connection axial line and a cross section taken along a fourth connection axial line of a lower arm portion of the front wheel suspension apparatus and a cross section taken along a center axial line of a connection portion of a front lower end portion of a cushion unit.

Referring also to FIG. 7, the lower arm portion 18 is supported at a front end portion 18a thereof for rocking motion on the connection portion 12b of the head pipe 12 through a bolt 36a serving as a connecting member extending along the vehicle widthwise direction. Further, the lower arm portion 18 is supported at a rear end portion 18b thereof for rocking motion on the connection portion 2c of the front block 2 through a bolt 37a serving as a connection member extending along the vehicle widthwise direction. A connection portion 18e is formed at a front lower portion of the lower arm portion 18, and a front lower end portion 20a of the cushion unit 20 is connected to the connection portion 18e.

The lower arm portion 18 integrally has a pair of left and right arm main bodies 18c extending forwardly and rearwardly, and a cross member 18d which connects rear end portions 18b of the left and right arm main bodies 18c to each other. The elements of the lower arm portion 18 individually are a unitary part, for example, of aluminum, and are coupled integrally to each other by welding. The lower arm portion 18 has a length in the forward and rearward direction greater than the length of the upper arm portion 17 in the forward and rearward direction. Referring to FIG. 2, the length W2 of a second line segment interconnecting a third connection axial line C11 and a fourth connection axial line C12 is greater than the length W1 of a first line segment interconnecting the first connection axial line C9 and the second connection axial line C10 (W2>W1).

The left and right arm main bodies 18c are disposed on the opposite left and right sides of a lower portion of the cushion unit 20. The left and right arm main bodies 18c are curved to the inner side in the vehicle widthwise direction such that they extend along an outer peripheral face of a lower portion of the cushion unit 20 (spring 20f hereinafter described). A space 18s curves to the inner side in the vehicle widthwise direction is formed in the inside of the left and right arm main bodies 18c.

The cross member 18d extends in the vehicle widthwise direction behind a lower portion of the cushion unit 20. Opposite ends of the cross member 18d are joined to the rear end portions 18b of the left and right arm main bodies 18c.

An insertion hole 36h is formed in the front end portion 18a of the left and right arm main bodies 18c and is open in the vehicle widthwise direction. In a state in which the connection portion 12b of the head pipe 12 is sandwiched between the front end portions 18a of the left and right arm main bodies 18c, a bolt 36a is screwed into and tightened to a nut 36b through the insertion hole 36h and an inner circumference of the connection portion 12b. On an outer circumference of the bolt 36a, a pair of left and right side collars 36j, a center collar 36i and a ball bearing 36g are provided. The side collars 36j are provided to support a pair of left and right needle bearings 36m. The center collar 36i is provided to assure a distance between the left and right side collars 36j. The ball bearing 36g is acted upon by thrust through the right side collar 36j and the center collar 36i. The lower arm portion 18 is supported at the front end portion 18a thereof for rocking motion on the connection portion 12b through the left and right side collars 36j, center collar 36i and ball bearing 36g.

It is to be noted that reference character C11 in the figures denotes a center axial line of the bolt 36a. In the following description, the center axial line C11 is sometimes referred to as third connection axial line.

An insertion hole 37h is formed at the left and right connection portions 2c of the front block 2 such that it is open in the vehicle widthwise direction. An adjust collar 37k is provided at the left connection portion 2c of the front block 2 for adjusting the left and right gaps. In a state in which the rear end portion 18b of the lower arm portion 18 (rear end portions 18b of the left and right arm main bodies 18c and cross member 18d) is sandwiched between the left and right connection portions 2c of the front block 2, a bolt 37a is screwed into and tightened to a nut 37b through the insertion hole 37h and an inner circumference of the rear end portion 18b of the lower arm portion 18. On an outer circumference of the bolt 37a, a pair of left and right side collars 37j, a center collar 37i and a ball bearing 37g are provided. The side collars 37j are provided to support a pair of left and right needle bearings 37m. The center collar 37i is provided to assure a distance between the left and right side collars 37j. The ball bearing 37g is acted upon by thrust through the right side collar 37j and the center collar 37i. The lower arm portion 18 is supported at the rear end portion 18b thereof for rocking motion on the left and right connection portions 2c through the left and right side collars 37j, center collar 37i and ball bearing 37g.

It is to be noted that reference character C12 in the figure denotes a center axial line of the bolt 37a. In the following description, the center axial line C12 is sometimes referred to as fourth connection axial line.

Further, a bead shape 12e is formed between the connection portion 12a and the connection portion 12b of the head pipe 12 as viewed in side elevation in FIG. 2. The bead shape 12e is formed along a line segment interconnecting the first connection axial line C9 and the third connection axial line C11.

Further, reference character AX1 in the figure denotes a first straight line which passes the first connection axial line C9 and the second connection axial line C10 as viewed in side elevation. Reference character AX2 in the figure denotes a second straight line which passes the third connection axial line C11 and the fourth connection axial line C12 as viewed in side elevation.

In the 1G state in the figure, the first straight line AX1 of the upper arm portion 17 and the second straight line AX2 of the lower arm portion 18 extend in parallel to each other.

Referring to FIGS. 2, 6, 7 and 9, the cushion unit 20 is connected at the front lower end portion 20a thereof for rocking motion to the lower arm portion 18 and connected at the rear upper end portion 20b thereof for rocking motion to the supporting portion 2a. The cushion unit 20 causes the front lower end portion 20a to carry out a stroke movement to exert a buffering action by rocking motion of the lower arm portion 18.

The cushion unit 20 has a damper 20e and a spring 20f. The damper 20e is a rod type damper which is inclined to a rear side toward the upper side as viewed in side elevation.

The spring 20f is a coil spring which surrounds the damper 20e.

The cushion unit 20 carries out a stroke movement by being compressed and decompressed along a center axial line C15 thereof to obtain a predetermined buffering action.

The front lower end portion 20a of the cushion unit 20 is positioned in front of an intermediate position of the lower arm portion 18 in the forward and rearward direction. In FIG. 9, the front lower end portion 20a of the cushion unit 20 is positioned in front of a midpoint Pm of a line segment interconnecting the third connection axial line C11 and the fourth connection axial line C12 as viewed in side elevation and besides is positioned lower than the line segment.

The rear upper end portion 20b of the cushion unit 20 is positioned behind the rear end portion 17b of the upper arm portion 17. Further, the rear upper end portion 20b of the cushion unit 20 is positioned in the proximity of and below the shaft portion 11a of the handlebar post 11. Meanwhile, the rear upper end portion 20b of the cushion unit 20 is positioned upwardly rearwardly of the rear end portion 18b of the lower arm portion 18.

Referring to FIG. 7, an insertion hole 39h is formed at the left and right connection portions 18e of the lower arm portion 18 such that it is open in the vehicle widthwise direction. In a state in which the front lower end portion 20a of the cushion unit 20 is sandwiched between the left and right connection portions 18e of the lower arm portion 18, a bolt 39a is inserted through the insertion hole 39h and an inner circumference of the front lower end portion 20a of the cushion unit 20. Further, a nut 39b is screwed into and tightened to a projecting portion of the bolt 39a. A collar 39j for supporting a needle bearing 39m is provided on an outer circumference of the bolt 39a. The cushion unit 20 is supported at the front lower end portion 20a thereof for rocking motion on the left and right connection portions 18e through the collar 39j.

It is to be noted that reference character C13 in the figure denotes a center axial line of the bolt 39a.

Referring to FIG. 6, an insertion hole 38h is formed at the left and right connection portions 2e of the supporting portion 2a such that it is open in the vehicle widthwise direction. In a state in which the rear upper end portion 20b of the cushion unit 20 is sandwiched between the left and right connection portions 2e of the supporting portion 2a, a bolt 38a is inserted through the insertion hole 38h and an inner circumference of the rear upper end portion 20b of the cushion unit 20. Further, a nut 38b is screwed into and tightened to a projecting portion of the bolt 38a. A collar 38j is provided on an outer circumference of the bolt 38a for supporting a needle bearing 38m. The cushion unit 20 is supported at the rear upper end portion 20b thereof for rocking motion on the left and right connection portions 2e through the collar 38j.

It is to be noted that reference character C14 denotes a center axial line of the bolt 38a.

Here, FIGS. 1 and 9 depict a 1G state in which the load of the vehicle is applied to the front wheel suspension apparatus 10.

If the front wheel 9 is relatively displaced upwardly from this state by braking of the front wheel or the like, then the rockable arm 16 is rocked upwardly and the front fork 19 and the head pipe 12 are displaced upwardly. At this time, the lower arm portion 18 is pivoted in the clockwise direction around the fourth connection axial line C12. Consequently, the lower arm portion 18 displaces the front lower end portion 20a of the cushion unit 20 upwardly to compress the cushion unit 20.

When the head pipe 12 is displaced upwardly, also the steering member 13 is displaced integrally in response to the upward displacement. At this time, the pivotal member 14 is displaced with respect to the handlebar post 11 and besides the angle of the steering axial line C3 with respect to the steering axial line C2 varies. However, this variation is absorbed by rocking motion of the left and right first ball joints 40 and the left and right second ball joints 43 and pivotal motion of the pivotal member 14.

On the other hand, if the front wheel 9 is relatively displaced downwardly from the 1G state described hereinabove by acceleration or the like, then the rockable arm 16 is rocked downwardly and the front fork 19 and the head pipe 12 are displaced downwardly. At this time, the lower arm portion 18 is pivoted forwardly in the counterclockwise direction around the fourth connection axial line C12. Consequently, the lower arm portion 18 displaces the front lower end portion 20a of the cushion unit 20 downwardly to elongate the cushion unit 20.

When the head pipe 12 is displaced downwardly, also the steering member 13 is displaced integrally by the downward displacement of the head pipe 12. At this time, the pivotal member 14 is displaced with respect to the handlebar post 11 and besides the angle of the steering axial line C3 with respect to the steering axial line C2 varies. However, this variation is absorbed by rocking motion of the left and right first ball joints 40 and the left and right second ball joints 43 and pivotal motion of the pivotal member 14.

As described above, in the embodiment described above, a steering structure for a saddle type vehicle includes a head pipe 12 which forms a steering axial line C3 offset to a front side with respect to a steering axial line C2 of a handlebar 8, a steering member 13 supported for pivotal motion on the head pipe 12 and configured to pivot around the steering axial line C3 integrally with a front wheel 9, a link member 15 connected at a first end portion thereof for pivotal motion on the steering member 13 and connected at a second end portion thereof for pivotal motion to the handlebar 8, and a pivotal member 14 provided between the first end portion of the link member 15 and the steering member 13 and supported on the steering member 13 for rotation around a pivotal axial line C4 extending along a center axial line C1 of an axle 9a of the front wheel 9.

According to this configuration, by connecting the steering member 13 and the handlebar 8 to each other by the link member 15 which can be pivoted at the opposite ends thereof, the steering mechanism wherein the handlebar 8 is offset to the rear of the steering member 13 can be configured. Further, even if an angle is generated between the steering axial line C2 and the steering axial line C3 by a stroke of the front wheel 9 or the like, this angle can be absorbed also by pivotal motion of the pivotal member 14. In other words, in the steering structure for a saddle type vehicle wherein the handlebar 8 and the front wheel suspension member are connected to each other by a link mechanism, the influence of upward and downward movement of the front wheel suspension apparatus 10 on steering can be reduced and the degree of freedom of the handlebar position can be raised.

Further, in the embodiment described above, a pair of left and right link members 15 are provided on the opposite sides in a vehicle widthwise direction, and the pivotal member 14 is disposed in the proximity of a front end of the pair of left and right link members 15 between the pair of left and right link members 15. Therefore, the influence of the pivotal member 14 on the layout in connection with peripheral members can be reduced.

Further, in the embodiment described above, a shaft supporting portion 13d which supports the pivotal member 14 on the steering member 13 is disposed on an upper side of the link member 15 as viewed in side elevation. Therefore, the influence of the shaft supporting portion 13d on the layout in connection with peripheral members can be reduced.

It is to be noted that, although, in the foregoing description of the embodiment, an example wherein the first straight line AX1 of the upper arm portion 17 and the second straight line AX2 of the lower arm portion 18 extend in parallel to each other in the 1G state is described, the arrangement of the first straight line AX1 and the second straight line AX2 is not limited to this.

For example, the first straight line AX1 of the upper arm portion 17 and the second straight line AX2 of the lower arm portion 18 may cross at rear extensions thereof with each other at a point Px such that the distance therebetween in the 1G state increases toward the front side as depicted in FIG. 10. In FIG. 10, the length of the lower arm portion 18 in the forward and rearward direction is equal to the length of the upper arm portion 17 in the forward and rearward direction. As viewed in side elevation, the length W2 of a second line segment interconnecting the third connection axial line C11 and the fourth connection axial line C12 is equal to the length W1 of a first line segment interconnecting the first connection axial line C9 and the second connection axial line C10 (W2=W1). In order to obtain such crossing arrangement as just described, for example, the vertical position of the second connection axial line C10 may be displaced downwardly or the vertical position of the fourth connection axial line C12 may be displayed upwardly as viewed in side elevation.

Further, though not depicted, the first straight line AX1 of the upper arm portion 17 and the second straight line AX2 of the lower arm portion 18 in the 1G state may cross at forward extensions thereof with each other such that the distance therebetween increases toward the rear side. In order to obtain such crossing arrangement as just described, for example, the vertical position of the second connection axial line C10 may be displaced upwardly or the vertical position of the fourth connection axial line C12 may be displaced downwardly, as viewed in side elevation.

In particular, the steering structure for a saddle type vehicle may further include an upper arm portion 17 connected at a front end portion 17*a* thereof to the head pipe 12 for rocking motion around a first connection axial line C9 extending along a vehicle widthwise direction and connected at a rear end portion 17*b* thereof to a vehicle body frame 1 for rocking motion around a second connection axial line C10 extending along the vehicle widthwise direction, and a lower arm portion 18 disposed below the upper arm portion 17 and connected at a front end portion 18*a* thereof to the head pipe 12 for rocking motion around a third connection axial line C11 extending along the vehicle widthwise direction and connected at a rear end portion 18*b* thereof to the vehicle body frame 1 for rocking motion around a fourth connection axial line C12 extending along the vehicle widthwise direction, wherein a first straight line AX1 which passes the first connection axial line C9 and the second connection axial line C10 as viewed in side elevation and a second straight line AX2 which passes the third connection axial line C11 and the fourth connection axial line C12 as viewed in side elevation cross with each other at forward or rearward extension portions thereof.

With the configuration just described, even if the steering member 13 carries out a stroke movement including an inclination with respect to the steering axial line C3 by rocking motion through the upper arm portion 17 and the lower arm portion 18 disposed with an angle therebetween as viewed in side elevation, the stroke can be absorbed by pivotal motion of the pivotal member 14.

Further, in the foregoing description of the embodiment, an example is described wherein the steering axial line C3 is spaced forwardly from the steering axial line C2 and the steering axial line C3 and the steering axial line C2 in the 1G state extend in parallel to each other. However, the arrangement of the steering axial line C3 and the steering axial line C2 is not limited to this. For example, the steering axial line C3 may be spaced forwardly from the steering axial line C2 and the steering axial line C3 and the steering axial line C2 may cross with each other. In short, only it is necessary for the steering axial line C3 to be spaced forwardly from the steering axial line C2.

Further, in the foregoing description of the embodiment, an example is described wherein the first axial line C5 is a straight line extending in the upward and downward direction of the vehicle and the second axial line C6 is a straight line extending in parallel to the first axial line C5 and in the upward and downward direction of the vehicle. However, the arrangement of the first axial line C5 and the second axial line C6 is not limited to this. For example, the first axial line C5 may be a straight line extending along a direction crossing with the vehicle widthwise direction, and the second axial line C6 may be a straight line extending in a direction crossing with the vehicle widthwise direction but different from the first axial line C5.

It is to be noted that the present invention is not limited to the embodiment described above, and for example, the saddle-type vehicle includes vehicles in general wherein a rider rides across the vehicle body, and includes not only motorcycles (including bicycles with a prime mover and scooter type vehicles) but also three-wheeled vehicles (including not only vehicles having one front wheel and two rear wheels but also vehicles having two front wheels and one rear wheel).

Further, the present invention may be applied to a vehicle in which a vertically installed engine other than a horizontally-opposed engine is installed or a vehicle in which a horizontally installed engine of which crank shaft extends along the vehicle widthwise direction is installed. A cushion unit or a cushion arm may be supported as a vehicle body on the engine.

Further, the configuration of the embodiment is an example of the present invention and can be modified in various manners without departing from the subject matter of the invention such as to replace the components of the embodiment with well-known components.

I claim:

1. A steering structure for a saddle type vehicle, comprising: a head pipe connected to a vehicle body frame of the saddle type vehicle, the head pipe forms a steering axial line of a steering member offset to a front side with respect to a steering axial line of a handlebar; a steering member supported for pivotal motion on the head pipe and configured to pivot around the steering axial line integrally with a front wheel; a link member connected at a first end portion thereof for pivotal motion on the steering member and connected at a second end portion thereof for pivotal motion to the handlebar; a pivotal member provided between the first end portion of the link member and the steering member and supported on the steering member for rotation around a pivotal axial line extending along a center axial line of an axle of the front wheel; and a rockable arm configured to permit rotation of the head pipe for rocking motion around a first connection axial line extending along a vehicle widthwise direction.

2. The steering structure for a saddle type vehicle according to claim 1,
wherein a pair of left and right link members are provided on the opposite sides in a vehicle widthwise direction; and
the pivotal member is disposed in a proximity of a front end of the pair of left and right link members between the pair of left and right link members.

3. The steering structure for a saddle type vehicle according to claim 1, wherein a shaft supporting portion which supports the pivotal member on the steering member is disposed on an upper side of the link member as viewed in side elevation.

4. The steering structure for a saddle type vehicle according to claim 1, wherein the rockable arm comprises: an upper arm portion connected at a front end portion thereof to the head pipe for rocking motion around the first connection axial line extending along a vehicle widthwise direction and connected at a rear end portion thereof to a vehicle body frame for rocking motion around a second connection axial line extending along the vehicle widthwise direction; and
a lower arm portion disposed below the upper arm portion and connected at a front end portion thereof to the head pipe for rocking motion around a third connection axial line extending along the vehicle widthwise direction and connected at a rear end portion thereof to the vehicle body frame for rocking motion around a fourth connection axial line extending along the vehicle widthwise direction; wherein
a first straight line which passes the first connection axial line and the second connection axial line as viewed in side elevation and a second straight line which passes the third connection axial line and the fourth connection axial line as viewed in side elevation cross with each other at forward or rearward extension portions thereof.

5. The steering structure for a saddle type vehicle according to claim 2, wherein a shaft supporting portion which supports the pivotal member on the steering member is disposed on an upper side of the link member as viewed in side elevation.

6. The steering structure for a saddle type vehicle according to claim 2, wherein the rockable arm comprises an upper arm portion connected at a front end portion thereof to the head pipe for rocking motion around the first connection axial line extending along a vehicle widthwise direction and connected at a rear end portion thereof to a vehicle body frame for rocking motion around a second connection axial line extending along the vehicle widthwise direction; and a lower arm portion disposed below the upper arm portion and connected at a front end portion thereof to the head pipe for rocking motion around a third connection axial line extending along the vehicle widthwise direction and connected at a rear end portion thereof to the vehicle body frame for rocking motion around a fourth connection axial line extending along the vehicle widthwise direction; wherein a first straight line which passes the first connection axial line and the second connection axial line as viewed in side elevation and a second straight line which passes the third connection axial line and the fourth connection axial line as viewed in side elevation cross with each other at forward or rearward extension portions thereof.

7. The steering structure for a saddle type vehicle according to claim 3, wherein the rockable arm comprises an upper arm portion connected at a front end portion thereof to the head pipe for rocking motion around the first connection axial line extending along a vehicle widthwise direction and connected at a rear end portion thereof to a vehicle body frame for rocking motion around a second connection axial line extending along the vehicle widthwise direction; and a lower arm portion disposed below the upper arm portion and connected at a front end portion thereof to the head pipe for rocking motion around a third connection axial line extending along the vehicle widthwise direction and connected at a rear end portion thereof to the vehicle body frame for rocking motion around a fourth connection axial line extending along the vehicle widthwise direction; wherein a first straight line which passes the first connection axial line and the second connection axial line as viewed in side elevation and a second straight line which passes the third connection axial line and the fourth connection axial line as viewed in side elevation cross with each other at forward or rearward extension portions thereof.

\* \* \* \* \*